United States Patent
Huang et al.

(10) Patent No.: US 10,578,177 B2
(45) Date of Patent: Mar. 3, 2020

(54) DEVICE FOR DETECTING THICKNESS OF BRAKE PAD

(71) Applicant: TONGREN UNIVERSITY, Guizhou (CN)

(72) Inventors: Wei Huang, Guizhou (CN); Wei Shi, Guizhou (CN); Senlin Leng, Guizhou (CN); Renhui Zhang, Guizhou (CN); Yu Long, Guizhou (CN); Jingjing Jiang, Guizhou (CN); Lei Guo, Guizhou (CN); Yingchang Yang, Guizhou (CN); Qiang Wang, Guizhou (CN); Shuai Huang, Guizhou (CN)

(73) Assignee: TONGREN UNIVERSITY, Guizhou (CN)

(*) Notice: Subject to any disclaimer, the term of this patent is extended or adjusted under 35 U.S.C. 154(b) by 95 days.

(21) Appl. No.: 15/783,393

(22) Filed: Oct. 13, 2017

(65) Prior Publication Data
US 2018/0038435 A1 Feb. 8, 2018

Related U.S. Application Data

(63) Continuation of application No. PCT/CN2016/080150, filed on May 11, 2016.

(51) Int. Cl.
*F16D 66/02* (2006.01)
*F16D 66/00* (2006.01)
*F16D 65/12* (2006.01)

(52) U.S. Cl.
CPC .......... *F16D 66/026* (2013.01); *F16D 65/125* (2013.01); *F16D 66/00* (2013.01);
(Continued)

(58) Field of Classification Search
CPC .............. F16D 66/026; F16D 65/125; F16D 2200/0004; F16D 66/00; F16D 66/02;
(Continued)

(56) References Cited

U.S. PATENT DOCUMENTS 3,958,445 A * 5/1976 Howard ................ F16D 66/026
73/7
5,608,376 A * 3/1997 Ito ......................... F16D 66/026
116/208

(Continued)

FOREIGN PATENT DOCUMENTS

CN 203856934 U 10/2014
CN 204041799 U 12/2014

(Continued)

OTHER PUBLICATIONS

International Search Report and Written Opinion dated Jan. 26, 2017 by the International Searching Authority for Patent Application No. PCT/CN2016/080150, which was filed on May 11, 2016 (Inventor—Huang et al.; Applicant—Tongren University) (10 pages).

*Primary Examiner* — Pamela Rodriguez
(74) *Attorney, Agent, or Firm* — Ballard Spahr LLP

(57) ABSTRACT

Provided is a device for detecting thickness of a brake pad, comprising a support body, a conducting wire or a resistor body, further comprising a conducting wire provided outside the support body, and possibly further comprising a resistor, some or all of the conducting wire, resistor body, and resistor are connected to form a circuit in a certain structure, and the conducting wire or the resistor body on the support body is rubbed together with the brake pad within a certain thickness range of the brake pad. By the present invention, the range of the thickness dimension of the brake pad can be determined, or the thickness dimension of the brake pad can be continuously reflected within a certain range.

2 Claims, 5 Drawing Sheets

(52) U.S. Cl.
CPC ........... *F16D 66/02* (2013.01); *F16D 66/027* (2013.01); *F16D 2200/0004* (2013.01)

(58) Field of Classification Search
CPC .... F16D 66/027; F16D 66/021; F16D 66/024; F16D 66/025; F16D 65/092
USPC ..... 188/1.11 L, 1.11 E, 250 R, 250 B, 251 R
See application file for complete search history.

(56) References Cited

U.S. PATENT DOCUMENTS

| | | | |
|---|---|---|---|
| 6,360,850 B1* | 3/2002 | Odisho | F16D 66/024 188/1.11 L |
| 6,477,893 B1* | 11/2002 | Djordjevic | F16D 66/02 188/1.11 L |
| 2013/0299289 A1* | 11/2013 | Eichler | F16D 66/027 188/251 R |

FOREIGN PATENT DOCUMENTS

| | | |
|---|---|---|
| CN | 204828410 U | 12/2015 |
| CN | 204961649 U | 1/2016 |
| JP | 2009-257550 A | 11/2009 |

\* cited by examiner

DEVICE FOR DETECTING THICKNESS OF BRAKE PAD

TECHNICAL FIELD

The present invention relates to the technical field of brake application, and particularly to a device for detecting the thickness of a brake pad.

BACKGROUND ART

A brake pad is an important constituent of a brake system for various transportation means equipped with a drum brake or a disc brake. The working principle of the brake is mainly based on rubbing, i.e. using the rubbing between a brake pad and a brake disc (drum) and between a tire and the ground, to convert the kinetic energy of vehicle movement to thermal energy through the rubbing, and to make the vehicle stop. A brake pad generally consists of a steel plate, an adhesive thermal insulating layer and a rubbing block. The rubbing block is pressed on the brake disc or a brake drum producing friction during brake operation, to slow down the vehicle. Due to the rubbing effect, the rubbing block would gradually wear; and when it wears to a critical position, the brake pad must be replaced, otherwise, the braking effect would decrease and even cause safety accidents.

Generally, whether the brake pad needs to be replaced is judged through two manners as follows: 1. The judgement is based on observation of the wearing situation of the brake pad: the thickness of a new vehicle brake pad is generally about 14 mm, which gradually gets thinner during continuous rubbing process. Professional technicists recommend that when the thickness of the brake pad is only half (about 7 mm) of the original thickness, observing by naked eyes, the vehicle owner should increase the self-checking frequency, and be prepared to replace the brake pad at any time. 2. The judgement is based on sound: the steel plates of some brake pads have protruding portions (a metal plate is additionally added on the brake pad in some cases) as a critical indicator, whose top point is related to the critical thickness of the brake pad. When the critical indicator touches the brake disc, it means that the thickness of the brake pad has reached or exceeded the critical thickness. When the brake is slightly stepped with a hiss, the brake pad must be replaced immediately. The brake disc also should be inspected immediately after the hissing to determine whether it should be replaced, because bad damage may occur.

The two judging methods mentioned above both have flaws. Observing with naked eyes has relatively large error because it is difficult to measure the thickness directly after the installment of the brake pad. Therefore, observation can be used only for preliminary judgment. Whether the brake pad needs to be replaced should be determined by detaching and measuring the brake pad, which is time consuming. Judging by sound is relatively precise but costs more. Because the hissing means the brake pad should be replaced.

DISCLOSURE OF THE INVENTION

An object of the present invention is to provide a device for detecting the thickness of a brake pad, so as to solve the problems put forward in the above background art.

In order to achieve the above object, Examples of the present invention provide technical solutions as follows:

A device for detecting the thickness of a brake pad includes a support body and a circuit structure; the circuit structure includes a first circuit structure provided on the support body and a second circuit structure provided outside the support body; the first circuit structure and the second circuit structure are interconnected. The first circuit structure includes a first conducting wire or/and a resistor body fixed on the support body. The second circuit structure includes a second conducting wire provided outside the support body, with the second conducting wire being structurally connected with the first circuit structure; or, the second circuit structure includes a second conducting wire provided outside the support body and a resistor connected with the second conducting wire, with the second conducting wire being structurally connected with the first circuit structure. The first conducting wire or/and the resistor body on the support body are configured to be rubbed together with the brake pad when a thickness of the brake pad is within a predetermined thickness range, and change at least one of on-off state and resistance value of the circuit structure.

Further, the first circuit structure includes the first conducting wire fixed on the support body; the second circuit structure includes the second conducting wire provided outside the support body. The first conducting wire includes at least two bent first sub-conducting wires; bending portions of the first sub-conducting wires are configured to be respectively corresponding to positions of predetermined thicknesses of the brake pad. The second conducting wire includes a plurality of second sub-conducting wires independent from each other; the plurality of second sub-conducting wires are connected with the corresponding ends of the first sub-conducting wires, respectively. The bending portions of the first sub-conducting wires are configured to be rubbed together with the brake pad when the thickness of the brake pad is within the predetermined thickness range, so that the first sub-conducting wires can be disconnected and electrically connected with a metal brake disc.

Further, the first circuit structure includes the first conducting wire fixed on the support body; the second circuit structure includes the second conducting wire set outside the support body and a resistor connected with the second conducting wire. The first conducting wire includes a first main conducting wire and at least two first sub-conducting wires; the first sub-conducting wires have one ends thereof connected to the first main conducting wire at intervals; and positions where the first sub-conducting wires and the first main conducting wire are connected are configured to be respectively corresponding to positions of predetermined thicknesses of the brake pad. The second conducting wire includes second sub-conducting wires connected, in one-to-one correspondence, with the first main conducting wire and the first sub-conducting wires; the resistor includes sub-resistors connected with the second sub-conducting wires in one-to-one correspondence; the second sub-conducting wires connected with the first sub-conducting wires are electrically interconnected, so the sub-resistors on the second sub-conducting wires connected with the first sub-conducting wires are connected in parallel. Portions of the first sub-conducting wires, at positions where the first sub-conducting wires and the first main conducting wire are connected, are configured to be rubbed together with the brake pad when the thickness of the brake pad is within the predetermined thickness range, so that the first sub-conducting wires can be disconnected at the positions where the first sub-conducting wires and the first main conducting wire are connected, causing the resistance value of the circuit structure to increase.

Further, the first circuit structure includes the first conducting wire fixed on the support body; the second circuit structure includes the second conducting wire set outside the support body and the resistor connected with the second conducting wire. The first conducting wire includes a first main conducting wire and at least two first sub-conducting wires; and one ends of the first main conducting wire and the first sub-conducting wires are configured to be respectively corresponding to positions of predetermined thicknesses of the brake pad; and the thickness of the brake pad to which the first main conducting wire is corresponding, is greater than the thicknesses of the brake pad to which the first sub-conducting wires are corresponding. The second conducting wire includes second sub-conducting wires connected, in one-to-one correspondence, with the other end of the first main conducting wire and the other ends of the first sub-conducting wires; the resistor includes sub-resistors connected with the second sub-conducting wires in one-to-one correspondence; and the second sub-conducting wires connected with the first sub-conducting wires are electrically interconnected. The ends of the first main conducting wire and the first sub-conducting wires, respectively corresponding to the positions of predetermined thicknesses of the brake pad, are configured to be rubbed together with the brake pad when the thickness of the brake pad is within the predetermined thickness range, so that the first main conducting wire and the first sub-conducting wires are electrically connected through contact with a metal brake disc, causing the resistance value of the circuit structure to reduce.

Further, the first circuit structure includes two first conducting wires and two resistor bodies which are fixed on the support body; the two resistor bodies are respectively connected with one ends of the two first conducting wires; the resistor bodies are configured to extend along the thickness direction of the brake pad. The cross sectional areas of the resistor bodies increase in a rubbing direction of the brake pad gradually. One end, away from the first conducting wire, of each of the two resistor bodies is corresponding to a position of predetermined thickness of the brake pad. The second circuit structure includes two second conducting wires outside the support body; and the two second conducting wires are connected with one end of every first conducting wire away from the resistor bodies, respectively. The two resistor bodies are configured to be rubbed together with the brake pad when the thickness of the brake pad is within the predetermined thickness range, so that the first circuit structure can be electrically connected through contact with a metal brake disc, causing the resistance value of the circuit structure to reduce.

Further, the first circuit structure includes a first conducting wire and one resistor body which are fixed on the support body; the first conducting wire includes one first main conducting wire and one first sub-conducting wire; one end of the first sub-conducting wire is connected with the resistor body; the resistor body is configured to extend along the thickness direction of the brake pad. The cross sectional area of the resistor body would increase in a rubbing direction of the brake pad gradually, and one end of the first main conducting wire and one end of the resistor body away from the first sub-conducting wire are both corresponding to positions of predetermined thicknesses of the brake pad. The second circuit structure includes two second conducting wires set outside the support body; the two second conducting wires are connected with the other end of the first main conducting wire and one end of the first sub-conducting wire away from the resistor body, respectively. The first main conducting wire and the resistor body are configured to be rubbed together with the brake pad when the thickness of the brake pad is within the predetermined thickness range, so the first circuit structure can be electrically connected through contact with a metal brake disc, causing the resistance value of the circuit structure to reduce.

Further, the resistor body is a trapezoidal body with an unchanged thickness in its extending direction.

Further, the resistor body is embodied as a conical cylinder.

Further, the first circuit structure includes two first conducting wires and one resistor body which are fixed on the support body; the resistor body is configured to extend along the thickness direction of the brake pad; the resistor body is a trapezoidal body with an unchanged thickness in its extending direction; a cross sectional area of the resistor body would increase in a rubbing direction of the brake pad gradually; the two first conducting wires extend respectively along two lateral sides of the resistor body. The second circuit structure includes two second conducting wires set outside the support body; the two second conducting wires are respectively connected with one ends of the two first conducting wires away from the resistor body. The first conducting wires and the resistor body are configured to be rubbed together with the brake pad when the thickness of the brake pad is within the predetermined thickness range, so that the height of the resistor body is reduced, causing the resistance value of the circuit structure to increase.

Further, the first circuit structure includes two first conducting wires and one resistor body which are fixed on the support body; the resistor body is configured to extend along the thickness direction of the brake pad; the resistor body is a trapezoidal body with an unchanged thickness in its extending direction; a cross sectional area of the resistor body would gradually reduce in a rubbing direction of the brake pad; the two first conducting wires extend respectively along two trapezoidal surfaces of the resistor body. The second circuit structure includes two second conducting wires set outside the support body; the two second conducting wires are respectively connected with one ends of the two first conducting wires away from the resistor body. The first conducting wires and the resistor body are configured to be rubbed together with the brake pad when the thickness of the brake pad is within the predetermined thickness range, so that the height of the resistor body is reduced, causing the resistance value of the circuit structure to increase.

Further, the first circuit structure includes a resistor body and two first conducting wires which are fixed on the support body; the resistor body includes at least two sub-resistor bodies which are bent; bending portions of the sub-resistor bodies are configured to be respectively corresponding to positions of predetermined thicknesses of the brake pad; and the sub-resistor bodies are connected in parallel between the two first conducting wires. The second circuit structure includes two second conducting wires set outside the support body; and the two second conducting wires are respectively connected with one ends of the two first conducting wires away from the resistor body. The bending portions of the sub-resistor bodies are configured to be rubbed together with the brake pad when the thickness of the brake pad is within the predetermined thickness range, so that the resistor body is disconnected, causing the resistance of the circuit structure to increase.

Further, the second circuit structure further includes one resistor; and the resistor is connected with one of the second conducting wires.

Further, the first circuit structure includes the resistor body and the first conducting wire which are fixed on the support body; the first conducting wire includes a first main conducting wire and a first sub-conducting wire; the resistor body includes at least two strip-shaped sub-resistor bodies; one ends of the first main conducting wire and the first sub-conducting wires are configured to be respectively corresponding to positions of predetermined thicknesses of the brake pad; the thickness of the brake pad to which the first main conducting wire is corresponding, is greater than the thicknesses of the brake pad to which the sub-resistor bodies are corresponding; and the other ends of the respective sub-resistor bodies are electrically connected by the first sub-conducting wire. The second circuit structure includes two second conducting wires set outside the support body; the two second conducting wires are connected with the first main conducting wire and the first sub-conducting wire, respectively. The first main conducting wire and the sub-resistor bodies are configured to be rubbed together with the brake pad when the thickness of the brake pad is within the predetermined thickness range, so that the first main conducting wire and the sub-resistor bodies are electrically connected through contact with a metal brake disc, causing the resistance value of the circuit structure to reduce.

Further, the second circuit structure further includes one resistor; and the resistor is connected with one of the second conducting wires.

Further, the first circuit structure includes the first conducting wire fixed on the support body; and the second circuit structure includes the second conducting wire set outside the support body and a resistor connected with the second conducting wire. The first conducting wire includes at least two first sub-conducting wires, one first main conducting wire and at least two first auxiliary conducting wires. The first sub-conducting wires have one ends thereof connected to the first main conducting wire at intervals; positions where the first sub-conducting wires and the first main conducting wire are connected are configured to be respectively corresponding to positions of predetermined thicknesses of the brake pad. Ends of the first auxiliary conducting wires are configured to be respectively corresponding to positions of predetermined thicknesses of the brake pad. The second conducting wire includes second sub-conducting wires connected, in one-to-one correspondence, with the first main conducting wire, the first auxiliary conducting wires and the first sub-conducting wires; the resistor includes sub-resistors connected with the second sub-conducting wires in one-to-one correspondence. The second sub-conducting wires, connected with the first sub-conducting wires, are electrically interconnected, so that the sub-resistors on the second sub-conducting wires connected with the first sub-conducting wires are connected in parallel. The second sub-conducting wires connected with the first auxiliary conducting wires and the first sub-conducting wires are electrically interconnected, so that the sub-resistors on the second sub-conducting wires connected with the first auxiliary conducting wires and the first sub-conducting wires are connected in parallel. Portions of the first sub-conducting wires, at positions where the first sub-conducting wires and the first main conducting wire are connected, are configured to be rubbed together with the brake pad when the thickness of the brake pad is within the predetermined thickness range, so that the first sub-conducting wires are disconnected at the positions where the first sub-conducting wires and the first main conducting wire are connected, causing the resistance value of the circuit structure to increase; or, the first main conducting wire and the first auxiliary conducting wires are configured to be rubbed together with the brake pad when the thickness of the brake pad is within the predetermined thickness range, so that the first main conducting wire and the first auxiliary conducting wires are electrically connected through contact with a metal brake disc, causing the resistance value of the circuit structure to reduce.

The examples of the present invention have the following advantages and beneficial effects:

The device for detecting thickness of a brake pad described in Examples of the present invention has the circuit structure, which is rubbed together with the brake pad when the thickness of the brake pad is within the predetermined thickness range. As the thickness of the brake pad changes and the first conducting wire or/and the resistor body are rubbed, the state of the circuit structure changes and at least one of the on-off state and the resistance value of the circuit structure is changed. The thickness of the brake pad can be determined through the change of the on-off state or/and the resistance value of the circuit structure. The detection is of high degree of accuracy, easy to perform, and has little damage to the brake disc.

Figure 1:
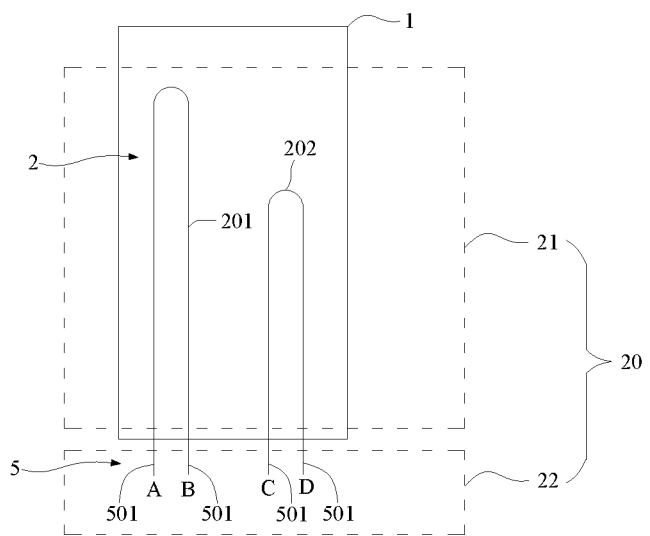
FIG. 1 is a schematic diagram of a first structure of a device for detecting thickness of a brake pad provided in an example of the present invention.

In the figures: 10—device for detecting thickness of a brake pad; 20—circuit structure; 21—first circuit structure; 22—second circuit structure; 1—support body; 2—first conducting wire; 201, 202, 203, 204, 205—first sub-conducting wire 211—first main conducting wire; 221, 222, 223—first auxiliary conducting wire, 3—resistor; 301, 302, 303, 304, 305, 306, 307—sub-resistor; 4—resistor body; 401, 402, 403, 404, 405—sub-resistor body; 5—second conducting wire; 501, 502, 503, 504, 505, 506, 507—second sub-conducting wire.

DETAILED DESCRIPTION OF EMBODIMENTS

Below technical solutions of the examples of the present invention will be described clearly and completely in conjunction with the figures of the present invention. Apparently, only some, not all, of the examples of the present invention are described. Based on the examples of the present invention, all of other examples, obtained by a person ordinarily skilled in the art without using inventive efforts, shall fall within the scope of protection of the present invention.

A technical solution provided in the present invention comprises: a device for detecting thickness of a brake pad, including a support body and a conducting wire or a resistor body fixed thereon, further including a conducting wire provided outside the support body, and possibly further including a resistor, the conducting wire or the resistor body on the support body being connected with the conducting wire or with the conducting wire and the resistor provided outside the support body to form a circuit in a certain structure, and the conducting wire or the resistor body on the support body being rubbed together with the brake pad within a certain thickness range of the brake pad, further causing changes of electrical parameters of the circuit structure or a certain portion of the circuit, thus determining the thickness of the brake pad.

Further, a device for detecting thickness of a brake pad includes a support body and a circuit structure; wherein the circuit structure includes a first circuit structure provided on the support body and a second circuit structure provided outside the support body; the first circuit structure and the second circuit structure are interconnected; the first circuit structure includes a first conducting wire and/or a resistor body fixed on the support body; the second circuit structure includes a second conducting wire provided outside the support body, the second conducting wire being structurally connected with the first circuit structure; or the second circuit structure includes a second conducting wire provided outside the support body and a resistor connected with the second conducting wire, the second conducting wire being structurally connected with the first circuit structure; the first conducting wire or/and the resistor body on the support body are configured to be rubbed together with the brake pad when a thickness of the brake pad is within a predetermined thickness range, and change at least one of on-off state and resistance value of the circuit structure.

The above device for detecting thickness of a brake pad has a circuit structure, and the circuit structure is rubbed together with the brake pad when the thickness of the brake pad is within the predetermined thickness range. As the thickness of the brake pad changes, the state of the circuit structure changes because the first conducting wire or/and the resistor body are rubbed, so that at least one of the on-off state and the resistance value of the circuit structure changes. The thickness of the brake pad can be judged according to the change of the on-off state or/and the resistance value of the circuit structure. The detection is of high degree of accuracy, easy to perform and has little damage to the brake disc.

Various examples of the above device for detecting thickness of a brake pad are provided below for further illustrating the structure and the working process of the device for detecting thickness of a brake pad.

EXAMPLE 1

As demonstrated in FIG. 1, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The support body 1 is embodied as a PCB board. The first circuit structure 21 includes a first conducting wire 2. The first conducting wire 2 includes two first sub-conducting wires, which are numbered as the first sub-conducting wire 201 and the first sub-conducting wire 202 for identification. The second circuit structure 22 includes a second conducting wire 5, and the second conducting wire 5 includes four second sub-conducting wires 501. The four second sub-conducting wires 501 are connected with ends of the first sub-conducting wire 201 and the first sub-conducting wire 202, respectively. In the present example, the first sub-conducting wires are copper conducting wires of 0.05 mm bent into a "U" shape, and are bonded onto the support body 1 via high-temperature insulating glue. The second sub-conducting wires 501 are copper conducting wires of 0.05 mm. End points of two second sub-conducting wires 501 connected with the first sub-conducting wire 201, away from the first sub-conducting wire 201, are named as point "A" and point "B" for identification, respectively. End points of two second sub-conducting wires 501 connected with the first sub-conducting wire 202, away from the first sub-conducting wire 202, are named as point "C" and point "D" for identification respectively The working process of the device 10 for detecting thickness of a brake pad provided in the present example is described as follows:

The support body 1 is fixed with the brake pad, and top points of bending portions of the first sub-conducting wire 201 and the first sub-conducting wire 202 are corresponding to positions of the brake pad where the thicknesses are 8 mm and 7 mm, respectively. Another copper conducting wire (not shown in the figure) with a diameter of 0.3 mm is taken, and its one end is connected with a brake disc, and the other end is named as point "E". One direct-current power supply with a voltage of 3.0 V is connected in series with one resistor of 100Ω (preventing short circuit of the circuit) and one ammeter for testing whether the circuit is electrically connected. The brake pad with this device is set up to be in contact with the brake disc for 1-hour rubbing, and then tested whether the point "A" and the point "B" are electrically connected and whether the point "C" and the point "D" are electrically connected when the brake pad does not contact the brake disc; also tested whether the point "A" (or "B") and the point "E" are electrically connected and whether the point "C" (or "D") and the point "E" are electrically connected when the brake pad contacts the brake disc. Then, the foregoing rubbing and test operations are repeated. When the connection state changes, the thickness of the brake pad is measured, then the foregoing operations are repeated again to continue with the rubbing and testing, until it is found by testing that the point "A" and the point "B" are not electrically connected and the point "C" and the point "D" are not electrically connected when the brake pad does not contact brake disc, or that the point "A" (or "B") and the point "E" are electrically connected and the point "C" (or "D") and the point "E" are electrically connected when the brake pad contacts brake disc. Then, the rubbing operation is stopped and the thickness of the brake pad is measured. Before the rubbing is performed, if the point "A" and the point "B" are electrically connected and the point "C" and the point "D" are electrically connected when the brake pad does not contact brake disc, and the point "A" (or "B") and the point "E" are not electrically connected and the point "C" (or "D") and the point "E" are not electrically connected when the brake pad contacts brake disc, the thickness of the brake pad is measured to be 14.0 mm. When it happens that the brake pad does not contact the brake disc, the point "A" and the point "B" are not electrically connected and the point "C" and the point "D" are electrically connected, and when the brake pad contacts the brake disc, the point "A" (or "B") and the point "E" are electrically connected and the point "C" (or "D") and the point "E" are not electrically connected, the thickness of the brake pad is measured to be 7.96 mm. When it happens that the brake pad does not contact the brake disc, the point "A" and the point "B" are not electrically connected and the point "C" and the point "D" are not electrically connected, and when the brake pad contacts the brake disc, the point "A" (or "B") and the point "E" are electrically connected and the point "C" (or "D") and the point "E" are electrically connected, the thickness of the brake pad is measured to be 6.98 mm. Thus, it can be indicated that the on-off information of the device 10 for detecting thickness of a brake pad can reflect the thickness range of the brake pad. In the present example, when the brake pad does not contact the brake disc, the point "A" and the point "B" are electrically connected and the point "C" and the point "D" are electrically connected, or the brake pad contacts the brake disc, the point "A" (or "B") and the point "E" are not electrically connected and the point "C" (or "D") and the point "E" are not electrically connected, the thickness of the brake pad is 8 mm or above, reflecting that the thickness of the brake pad is in a normal use range; when the brake pad does not contact the brake disc, the point "A" and the point "B" are not electrically connected and the point "C" and the point "D" are electrically connected, or when the brake pad contacts the brake disc, the point "A" (or "B") and the point "E" are electrically connected and the point "C" (or "D") and the point "E" are not electrically connected, the thickness of the brake pad is 7 mm~8 mm, reflecting that the thickness of the brake pad is in the normal use range, but it needs to replaced; when the brake pad does not contact the brake disc, the point "A" and the point "B" are not electrically connected and the point "C" and the point "D" are not electrically connected, or when the brake pad contacts the brake disc, the point "A" (or "B") and the point "E" are electrically connected and the point "C" (or "D") and the point "E" are electrically connected, correspondingly, the thickness of the brake pad is 7 mm or below, reflecting that the thickness of the brake pad is in an critical use range or below the critical thickness, and the brake pad should be replaced immediately.

It should be noticed that the numbers of the first sub-conducting wires and the second sub-conducting wires can be set according to practical situations.

EXAMPLE 2

Figure 2:
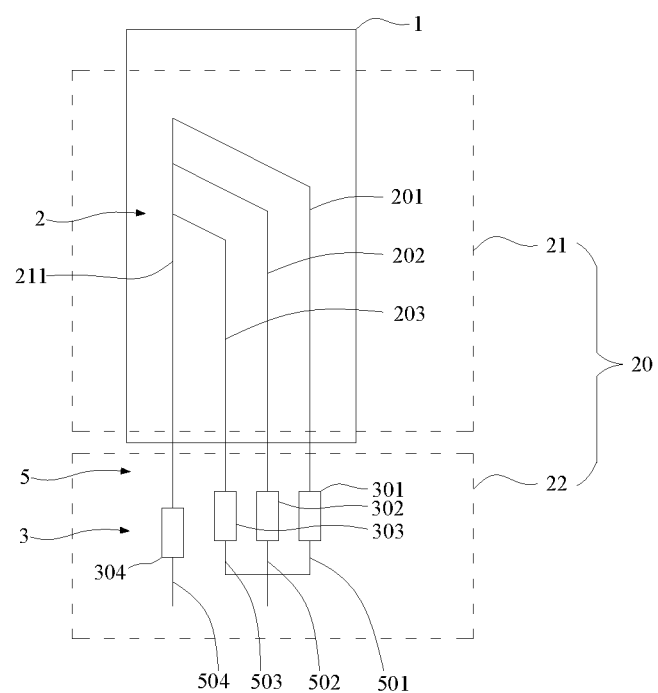
FIG. 2 is a schematic diagram of a second structure of a device for detecting thickness of a brake pad provided in an example of the present invention.

Referring to FIG. 2, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The first circuit structure 21 includes a first conducting wire 2. The first conducting wire 2 includes a first sub-conducting wire 201, a first sub-conducting wire 202, a first sub-conducting wire 203 and a first main conducting wire 211. The first sub-conducting wire 201, the first sub-conducting wire 202, and the first sub-conducting wire 203 are silver conducting wires with a diameter of 0.02 mm, and the first sub-conducting wires, after each having an end point connected with a copper wire (the first main conducting wire 211) with a diameter of 0.3 mm to form an angular shape, are embedded in the support body 1 made of plastic. The second circuit structure 22 includes a second conducting wire 5 and a resistor 3. The second conducting wire 5 includes a second sub-conducting wire 501, a second sub-conducting wire 502, a second sub-conducting wire 503 and a second sub-conducting wire 504. The second sub-conducting wire 501, the second sub-conducting wire 502, the second sub-conducting wire 503 and the second sub-conducting wire 504 are respectively connected with the first sub-conducting wire 201, the first sub-conducting wire 202, the first sub-conducting wire 203 and the first main conducting wire 211. The resistor 3 includes a sub-resistor 301 (with a resistance value of 100Ω), a sub-resistor 302 (with a resistance value of 150Ω), a sub-resistor 303 (with a resistance value of 300Ω) and a sub-resistor 304 (with a resistance value of 200Ω) respectively connected with the second sub-conducting wire 501, the second sub-conducting wire 502, the second sub-conducting wire 503 and the second sub-conducting wire 504.

The working process of the device 10 for detecting thickness of a brake pad provided in the present example is as follows:

the support body 1 is fixed with the brake pad. Positions where the first sub-conducting wire 201, the first sub-conducting wire 202 and the first sub-conducting wire 203 are respectively connected with the first main conducting wire 211 are corresponding to certain thicknesses of the brake pad. A connecting point of the first sub-conducting wire 201 with the first main conducting wire 211 is corresponding to a position of the brake pad where the thickness is 9 mm, a connecting point of the first sub-conducting wire 202 with the first main conducting wire 211 is corresponding to a position of the brake pad where the thickness is 7 mm, a connecting point of the first sub-conducting wire 203 with the first main conducting wire 211 is corresponding to a position of the brake pad where the thickness is 6.5 mm. A voltmeter is connected with two ends of a parallel circuit portion for testing the voltage of the circuit of this portion. One direct-current power supply with a voltage of 12 V is used to supply power to the circuit. For a series circuit, according to relevant physics knowledge, it can be known:

$$U_{sum} = U_1 + U_2 + \ldots + U_n$$

$$\frac{U_1}{R_1} = \frac{U_2}{R_2} = \ldots = \frac{U_n}{R_n} = \frac{U_{sum}}{R_{sum}}$$

In the formulas, $U_1, U_2 \ldots U_n$ indicate voltages of respective sections in the circuit, $U_{sum}$ indicates total voltage of the circuit, $R_1, R_2 \ldots R_n$ indicate resistances of respective sections in the series circuit, and $R_{sum}$ indicates total resistance of the circuit. Putting in known conditions, the resistance of the circuit can be calculated by the voltages of the circuit through the above calculation formulas.

For the parallel circuit, according to relevant physics knowledge, it can be known that the relationship between the resistance value R and the respective resistance values is:

$$\frac{1}{R_{parallel}} = \frac{1}{R_1} + \frac{1}{R_2} + \ldots + \frac{1}{R_n} = \sum_1^n \frac{1}{R_n}$$

In the formula, $R_1, R_2 \ldots R_n$ indicate resistance values of respective branches in the parallel circuit.

According to the above calculation formula and known conditions, the resistance of the parallel circuit can be determined by corresponding calculation.

A brake pad with this device is brought to contact a brake disc for rubbing, which is then stopped after 1 hour, the brake pad, when it does not contact the brake disc, is electrically connected with a power supply circuit, and the voltage of the circuit is tested; then the foregoing operations are repeated to continue with the rubbing and testing, and when it is found that the circuit voltage has relatively great changes, the thickness of the brake pad is measured, then the foregoing operations are repeated to continue with the rubbing and testing, until it is found by testing that the circuit voltage is 12 V when the brake pad does not contact the brake disc, the rubbing operation is stopped and the thickness of the brake pad is measured. During this process, prior to performing the rubbing, if when the brake pad does not contact the brake disc and is electrically connected with the power supply circuit, the circuit voltage is tested as about 2.4 V, the thickness of the brake pad is measured as about 14 mm; if it is found that when the brake pad does not contact the brake disc and is electrically connected with the power supply circuit, the circuit voltage is tested as about 4 V, the thickness of the brake pad is measured as about 8.92 mm; if it is found that when the brake pad does not contact the brake disc and is electrically connected with the power supply circuit, the circuit voltage is tested as about 7.2 V, the thickness of the brake pad is measured as about 6.94 mm; and if it is found that when the brake pad does not contact the brake disc and is electrically connected with the power supply circuit, the circuit voltage is tested as about 12 V, the thickness of the brake pad is measured as about 6.48 mm. Thus, it can be indicated that the on-off information of the circuit of the present device can reflect the thickness range of the brake pad. In the present example, when the circuit voltage is tested as about 2.4 V in the case that the brake pad does not contact the brake disc and is electrically connected with the power supply circuit, it can be obtained by calculation that the circuit has a resistance of 50Ω, and is formed by parallel connection of the sub-resistor 301, the sub-resistor 302 and the sub-resistor 303, indicating that portions of the first sub-conducting wires, at positions where the first sub-conducting wire 201, the first sub-conducting wire 202 and the first sub-conducting wire 203 are respectively connected with the first main conducting wire 211, are all in good state, correspondingly, the thickness of the brake pad is 9 mm or above, reflecting that the thickness of the brake pad is in a normal use range; when the circuit voltage is tested as about 4 V in the case that the brake pad does not contact the brake disc and is electrically connected with the power supply circuit, it can be obtained by calculation that the circuit has a resistance of 100Ω, and is formed by parallel connection of the sub-resistor 302 and the sub-resistor 303 in parallel, indicating that the first sub-conducting wire 201 is disconnected due to the rubbing at the position where the first sub-conducting wire 201 is connected with the first main conducting wire 211, and the portions of the first sub-conducting wire 202 and the first sub-conducting wire 203, at positions where the first sub-conducting wire 202 and the first sub-conducting wire 203 are respectively connected with the first main conducting wire 211, are in good state, correspondingly, the thickness of the brake pad is 7 mm~9 mm, reflecting that the thickness of the brake pad is in the normal use range, but it should be ready to replace the brake pad; when the circuit voltage is tested as about 7.2 V in the case that the brake pad does not contact the brake disc and is electrically connected with the power supply circuit, it can be obtained by calculation that the circuit has resistance of 300Ω, and is formed by the sub-resistor 303, indicating that the first sub-conducting wire 201 and the first sub-conducting wire 202 are disconnected due to the rubbing at the positions where the first sub-conducting wire 201 and the first sub-conducting wire 202 are respectively connected with the first main conducting wire 211, and portion of the first sub-conducting wire 203, at the position where the first sub-conducting wire 203 is connected with the first main conducting wire 211, is in a good state, correspondingly, the thickness of the brake pad is 6.5 mm~7 mm, reflecting that the thickness of the brake pad is in an critical use range or less than an critical thickness, and the brake pad should be replaced immediately; and when the circuit voltage is tested as about 12 V in the case that the brake pad does not contact the brake disc and is electrically connected with the power supply circuit, it can be obtained by calculation that the circuit has resistance of ∞, indicating that the first sub-conducting wire 201, the first sub-conducting wire 202 and the first sub-conducting wire 203 are disconnected due to the rubbing respectively at positions where the first sub-conducting wire 201, the first sub-conducting wire 202 and the first sub-conducting wire 203 are respectively connected with the first main conducting wire 211, correspondingly, the thickness of the brake pad is 6.5 mm or below, reflecting that the thickness of the brake pad is less than the critical thickness, and the brake pad cannot be used but should be replaced immediately.

It should be indicated that the number of the first sub-conducting wires, the number of the second sub-conducting wires, and the number and the resistance values of the sub-resistors can be set according to practical situations.

EXAMPLE 3

Figure 3:
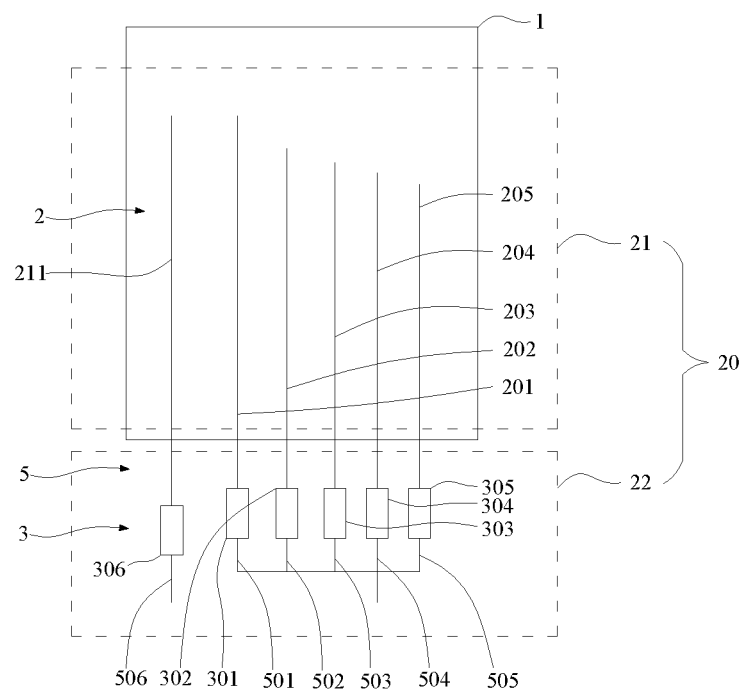
FIG. 3 is a schematic diagram of a third structure of a device for detecting thickness of a brake pad provided in an example of the present invention.

Referring to FIG. 3, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The support body 1 is embodied as an aluminum oxide ceramic substrate. The first circuit structure 21 includes a first conducting wire 2. The first conducting wire 2 includes a first sub-conducting wire 201, a first sub-conducting wire 202, a first sub-conducting wire 203, a first sub-conducting wire 204, a first sub-conducting wire 205 and a first main conducting wire 211. The first sub-conducting wire 201, the first sub-conducting wire 202, the first sub-conducting wire 203, the first sub-conducting wire 204, the first sub-conducting wire 205 and the first main conducting wire 211 are silver-film conducting wires, with the width of 1 mm and the thickness of 0.05 mm, fabricated on the support body 1 in a manner of screen printing, an interval between the silver-film conducting wires being 1 mm. The second circuit structure 22 includes a second conducting wire 5 and a resistor 3. The second conducting wire 5 includes a second sub-conducting wire 501, a second sub-conducting wire 502, a second sub-conducting wire 503, a second sub-conducting wire 504, a second sub-conducting wire 505 and a second main conducting wire 506. The second sub-conducting wire 501, the second sub-conducting wire 502, the second sub-conducting wire 503, a second sub-conducting wire 504, the second sub-conducting wire 505 and the second main conducting wire 506 are respectively connected with the first sub-conducting wire 201, the first sub-conducting wire 202, the first sub-conducting wire 203, the first sub-conducting wire 204, the first sub-conducting wire 205 and the first main conducting wire 211. The resistor 3 includes a sub-resistor 301 (with a resistance value of 200Ω), a sub-resistor 302 (with a resistance value of 780Ω), a sub-resistor 303 (with a resistance value of 480Ω), a sub-resistor 304 (with a resistance value of 240Ω), a sub-resistor 305 (with a resistance value of 82Ω) and a sub-resistor 306 (with a resistance value of 100Ω) respectively connected with the second sub-conducting wire 501, the second sub-conducting wire 502, the second sub-conducting wire 503, a second sub-conducting wire 504, the second sub-conducting wire 505 and the second main conducting wire 506. The second sub-conducting wire 501, the second sub-conducting wire 502, the second sub-conducting wire 503, the second sub-conducting wire 504 and the second sub-conducting wire 505 are electrically connected with each other.

The working process of the device 10 for detecting thickness of a brake pad provided in the present example is as follows:

the support body 1 is fixed with the brake pad, and an initial thickness of the brake pad is measured as 14.02 mm. A top point of the first sub-conducting wire 201 is corresponding to a position of the brake pad where the thickness is 14.02 mm, a top point of the first sub-conducting wire 202 is corresponding to a position of the brake pad where the thickness is 9 mm, a top point of the first sub-conducting wire 203 is corresponding to a position of the brake pad where the thickness is 8 mm, a top point of the first sub-conducting wire 204 is corresponding to a position of the brake pad where the thickness is 7 mm, a top point of the first sub-conducting wire 205 is corresponding to a position of the brake pad where the thickness is 6.5 mm, and a top point of the first main conducting wire 211 is corresponding to a position of the brake pad where the thickness is 14.02 mm. A multimeter is used to test resistance values of respective conducting wires respectively, wherein the resistance values of the first sub-conducting wire 201 and the second sub-conducting wire 501 are 201Ω, the resistance values of the first sub-conducting wire 202 and the second sub-conducting wire 502 are 786Ω, the resistance values of the first sub-conducting wire 203 and the second sub-conducting wire 503 are 480Ω, the resistance values of the first sub-conducting wire 204 and the second sub-conducting wire 504 are 241Ω, the resistance values of the first sub-conducting wire 205 and the second sub-conducting wire 505 are 82Ω, and the resistance values of the first main conducting wire 211 and the second sub-conducting wire 506 are 100Ω. The brake pad with this device is brought to contact the brake disc for rubbing, and the resistance value of the circuit is tested as about 301Ω; the rubbing is continued, and the resistance value of the circuit is tested, and when the resistance value is changed from about 301Ω to about 260Ω, the rubbing is stopped, and the thickness of the brake pad is measured as 8.98 mm; the rubbing is continued, and the resistance value of the circuit is tested, and when the resistance value is changed from about 260Ω to about 220Ω, the rubbing is stopped, and the thickness of the brake pad is measured as 8.00 mm; the rubbing is continued, and the resistance value of the circuit is tested, and when the resistance value is changed from about 220Ω to about 180.1Ω, the rubbing is stopped, and the thickness of the brake pad is measured as 6.98 mm; and the rubbing is continued, and the resistance value of the circuit is tested, and when the resistance value is changed from about 180.1Ω to about 140.5Ω, the rubbing is stopped, and the thickness of the brake pad is measured as 6.48 mm. Thus, it can be indicated that the resistance value information of the circuit of the present device can reflect the thickness range of the brake pad. In the present example, when the resistance value is about 301Ω, the first sub-conducting wire 201 is electrically connected with the first main conducting wire 211, correspondingly, the thickness of the brake pad is 9 mm or above, reflecting that the thickness of the brake pad is in a normal use range; when the resistance value is about 260Ω, the first sub-conducting wire 201 and the first sub-conducting wire 202 are electrically connected with the first main conducting wire 211, correspondingly, the thickness of the brake pad is 8 mm~9 mm, reflecting that the thickness of the brake pad is in the normal use range; when the resistance value is about 220Ω, the first sub-conducting wire 201, the first sub-conducting wire 202 and the first sub-conducting wire 203 are electrically connected with the first main conducting wire 211, correspondingly, the thickness of the brake pad is 7 mm~8 mm, reflecting that the thickness of the brake pad is still in the normal use range, but it should be ready to replace the brake pad; when the resistance value is about 180.1Ω, the first sub-conducting wire 201, the first sub-conducting wire 202, the first sub-conducting wire 203 and the first sub-conducting wire 204 are electrically connected with the first main conducting wire 211, correspondingly, the thickness of the brake pad is 6.5 mm~7 mm, reflecting that the thickness of the brake pad is in an critical use range, and the brake pad should be replaced immediately; when the resistance value is about 140.5Ω, all of the first sub-conducting wire 201, the first sub-conducting wire 202, the first sub-conducting wire 203, the first sub-conducting wire 204 and the first sub-conducting wire 205 are electrically connected with the first main conducting wire 211, correspondingly, the thickness of the brake pad is 6.5 mm or below, reflecting that the thickness of the brake pad is less than its use range.

It should be indicated that the number of the first sub-conducting wires, the number of the second sub-conducting wires, and the number and the resistance values of the sub-resistors can be set according to practical situations.

EXAMPLE 4

Figure 4:
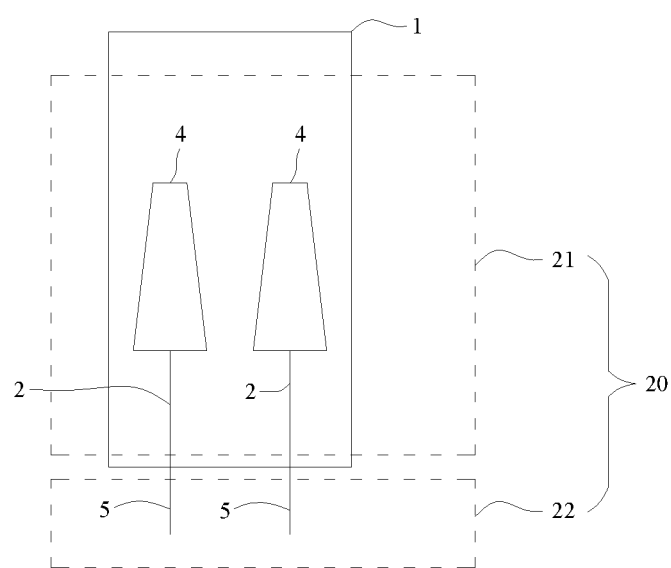
FIG. 4 is a schematic diagram of a fourth structure of a device for detecting thickness of a brake pad provided in an example of the present invention.

Referring to FIG. 4, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The first circuit structure 21 includes two first conducting wires 2 and two resistor bodies 4. The second circuit structure 22 includes two second conducting wires 5. A layer of insulating glue is coated inside the support body 1, then isosceles trapezoid new constantan films, with the thickness of 0.01 mm, the upper base length of 0.02 mm, the lower base length of 5.50 mm, and the height of 14 mm, are fabricated, as the resistor bodies 4, on the insulating glue by using a coating method. The first conducting wires 2 are silver wires with a diameter of 0.2 mm fixed on the support body 1. The two first conducting wires 2 are respectively connected with the lower bases of the two resistor bodies 4. The two second conducting wires 5 are respectively connected with the two first conducting wires 2.

The working process of the device 10 for detecting thickness of a brake pad provided in the present example is as follows:

the support body 1 is fixed with the brake pad, and upper bases of the resistor bodies 4 are aligned with a rubbing surface of the brake pad. The two second conducting wires 5 are connected with a resistance meter.

For the resistor body 4, according to relevant physics knowledge, it can be known that the expression of its total resistance value R is:

$$R = \rho \frac{l}{S}$$

In the expression, ρ indicates the resistivity of the material, l indicates the length along the current direction, and S indicates the sectional area perpendicular to the current direction.

The resistor body 4, having different resistances in various sections along the current direction, is regarded as a series structure of a plurality of resistors, then its resistance value can be expressed as:

$$R = \sum_{1}^{n} \rho \frac{l_i}{S_i}$$

In the formula, $l_i$ and $S_i$ indicate the length and sectional area of an i-th section, and n indicates the total number of the divided sections of the resistor body 4.

During the rubbing process, the length of the resistor body 4 will become short, R will be reduced, the length of the resistor body 4 can be calculated by measuring the resistance of the circuit, and further the thickness of the brake pad is obtained.

An initial thickness of the brake pad is measured as 14.08 mm. The brake pad is brought to contact the brake disc, at which time the circuit resistance is tested as 858 mΩ. The brake pad is brought to rub the brake disc, and the resistance value of the circuit is tested. The rubbing is stopped after a period of time, the resistance value of the circuit is recorded and the thickness of the brake pad is measured, then the rubbing is continued for a period of time and then stopped again, and the resistance value of the circuit is recorded and the thickness of the brake pad is measured, and the foregoing step of rubbing operation is repeated. Thus, a set of data of the resistance values and the thicknesses of the brake pad are obtained, and they are compared with the calculated values (see Table 1). It can be seen from the table that the practical test data are relatively close to the calculated values. The main cause of the errors is leaving the influence of temperature out of consideration. On the whole, the errors are below 1.5%, within an acceptable range.

EXAMPLE 5

Figure 5:
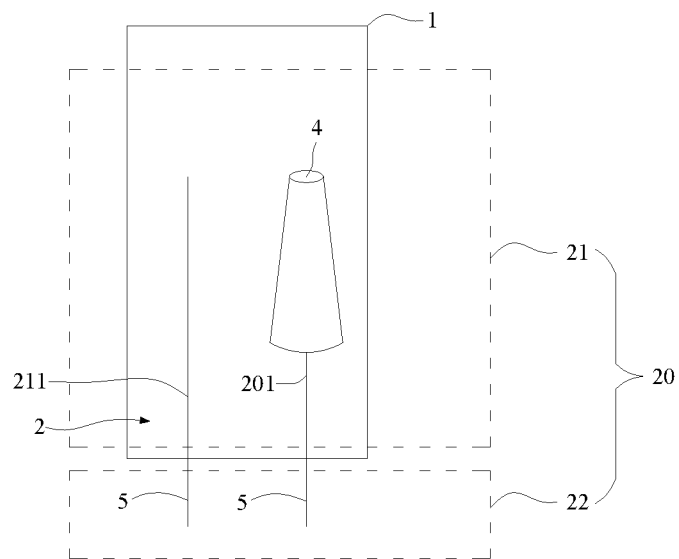
FIG. 5 is a schematic diagram of a fifth structure of a device for detecting thickness of a brake pad provided in an example of the present invention.

Referring to FIG. 5, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The first circuit structure 21 includes a first conducting wire 2 and one resistor body 4. The second circuit structure 22 includes two second conducting wires 5. The resistor body 4 uses an iron-chromium-aluminum conical cylinder, whose upper base surface has a diameter of 0.20 mm, lower base surface has a diameter of 6.55 mm, and height is 5.50 mm, as the resistor material, and its resistance is measured as 7.22 mΩ. The resistor body 4 is embedded in the support body 1. The first conducting wire 2 includes one first main conducting wire 211 and one first sub-conducting wire 201. Both the first main conducting wire 211 and the first sub-conducting wire 201 are formed by using copper wires with a diameter of 0.20 mm. Both the first main conducting wire 211 and the first sub-conducting wire 201 are embedded in the support body 1, wherein one end of the first main conducting wire 211 is aligned with the upper base surface of the resistor body 4, and one end of the first sub-conducting wire 201 is connected with the lower base surface of the resistor body 4. The other ends of the first main conducting wire 211 and the first sub-conducting wires 201 are respectively connected with the two second conducting wires 5.

The working process of the device 10 for detecting thickness of a brake pad provided in the present example is as follows:

both second conducting wires 5 are connected with a resistance meter, and the support body 1 is fixed with the brake pad, so that the upper base surface of the resistor body 4 is corresponding to the thickness of 11.50 mm of the brake pad, and the lower base surface is corresponding to the thickness of 6.00 mm of the brake pad. The brake pad is rubbed with the brake disc, and the resistance value of the circuit is tested, when the resistance value is shown to be changed from an open circuit state to be 7.22 mΩ or less, the rubbing is stopped, the resistance value of the circuit is recorded and the thickness of the brake pad is measured. Then the rubbing is continued for a period of time and stopped again, and the resistance value of the circuit is recorded and the thickness of the brake pad is measured, and the foregoing step of rubbing operation is repeated. Thus, a set of data of the resistance values and the thicknesses of the brake pad are obtained, and they are compared with the calculated values (see Table 2). It can be seen from the table that the practical test data are relatively close to the calculated values. The main causes of the errors are measuring error and leaving the influence of temperature out of consideration. On the whole, the errors are below 1.0%, within an acceptable range.

TABLE 1

| Comparison between Test Data and Calculated Data | | | | | | | | |
| --- | --- | --- | --- | --- | --- | --- | --- | --- |
| Resistance Value (mΩ) | 858 | 563 | 384 | 305 | 265 | 227 | 174 | 137 |
| Calculated Value (mm) | | 12.960 | 11.303 | 10.134 | 9.403 | 8.552 | 7.196 | 6.052 |
| Practical Value (mm) | 14.08 | 13.10 | 11.46 | 10.26 | 9.52 | 8.68 | 7.30 | 6.14 |
| Error (mm) | | 0.14 | 0.157 | 0.126 | 0.117 | 0.128 | 0.104 | 0.088 |
| Error (%) | | 1.080 | 1.389 | 1.243 | 1.244 | 1.497 | 1.445 | 1.454 |

TABLE 2

| Comparison between Test Data and Calculated Data | | | | | | | | |
|---|---|---|---|---|---|---|---|---|
| Resistance Value (mΩ) | 7.22 | 6.95 | 1.81 | 0.800 | 0.363 | 0.143 | 0.0657 | 0.0188 |
| Calculated Value (mm) | | 11.494 | 11.040 | 10.418 | 9.489 | 8.191 | 7.272 | 6.433 |
| Practical Value (mm) | 11.50 | 11.50 | 11.00 | 10.36 | 9.42 | 8.14 | 7.20 | 6.40 |
| Error (mm) | | 0.006 | −0.040 | −0.058 | −0.069 | −0.051 | −0.072 | −0.033 |
| Error (%) | | 0.056 | −0.366 | −0.559 | −0.728 | −0.625 | −0.995 | −0.521 |

EXAMPLE 6

Figure 6:
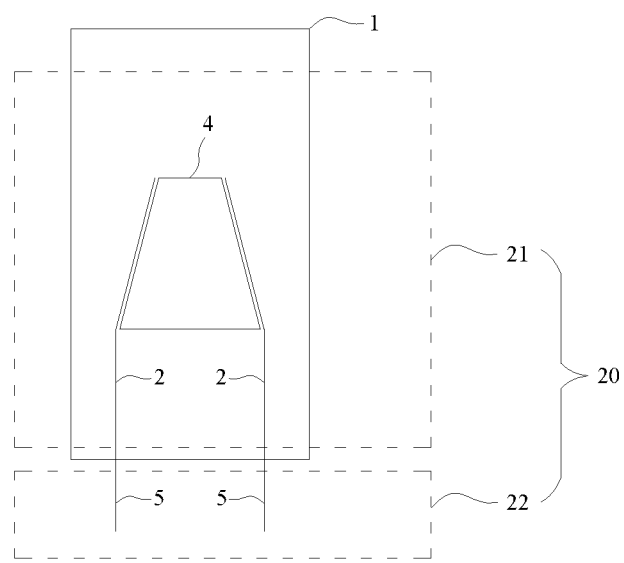
FIG. 6 is a schematic diagram of a sixth structure of a device for detecting thickness of a brake pad provided in an example of the present invention.

Referring to FIG. 6, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The first circuit structure 21 includes two first conducting wires 2 and a resistor body 4. The second circuit structure 22 includes two second conducting wires 5. An isosceles trapezoid constantan sheet, whose upper base length is 1 mm, lower base length is 10 mm, height is 8 mm, and thickness is 1 mm, is used as the resistor body 4, and its two side surfaces each including the lateral side are plated with silver electrodes, and are connected with silver conducting wires (the first conducting wires 2) with a diameter of 0.2 mm at the place close to the lower base, and the resistor body 4 is fixed on the support body 1 made of plastic. The two second conducting wires 5 are respectively connected with the two first conducting wires 2.

The working process of the device 10 for detecting thickness of a brake pad provided in the present example is as follows:

the support body 1 is fixed with the brake pad, and the upper base of the resistor body 4 is aligned with a rubbing surface of the brake pad. A resistor of 100Ω (for preventing short circuit) and an ammeter are connected in series in the circuit, and then are connected with a direct-current power supply of 12 V.

For the resistor body 4, according to relevant physics knowledge, it can be known that the expression of its total resistance value R is:

$$R = \rho \frac{l}{S}$$

In the expression, ρ indicates the resistivity of the material, l indicates the length along the current direction, and S indicates the sectional area perpendicular to the current direction.

Since the resistor body 4 has different resistances in various sections perpendicular to the current direction, it is regarded as a parallel structure of a plurality of resistors, and the relationship between its resistance value R and the respective sections is:

$$\frac{1}{R} = \frac{1}{R_1} + \frac{1}{R_2} + \ldots + \frac{1}{R_n} = \sum_1^n \frac{1}{R_n} = \sum_1^n \frac{S_i}{\rho l_i}$$

In the formula, $R_1, R_2 \ldots R_n$ indicate resistance values corresponding to various sections respectively, $l_i$ and $S_i$ indicate the length and sectional area of an i-th section, and n indicates the total number of the divided sections of the resistor body.

During the rubbing process, the dimension of the resistor body 4 in a direction perpendicular to the rubbing surface will become short, the resistance R will be increased, the resistance of the resistor body 4 can be calculated by measuring the current of the circuit, further the length of the resistor body 4 can be calculated, and further the thickness of the brake pad is obtained.

An initial thickness of the brake pad is measured as 14.0 mm. At this time, the circuit current is tested as 36.4 mA. The brake pad is brought to contact and rub the brake disc, after rubbing for a period of time, the rubbing is stopped, and the brake pad is made to not contact the brake disc, the current of the circuit is recorded and the thickness of the brake pad is measured, then the rubbing is continued, and the foregoing step of rubbing operation is repeated. Thus, a set of data of the currents and the thicknesses of the brake pad are obtained, and they are compared with the calculated values (see Table 3). It can be seen from the table that the practical test data are relatively close to the calculated values. The main causes of the errors are measuring error and leaving the influence of temperature out of consideration. On the whole, the errors are below 1.0%, within an acceptable range.

TABLE 3

| Comparison between Test Data and Calculated Data | | | | | | | | |
|---|---|---|---|---|---|---|---|---|
| Current (mA) | 36.4 | 24.6 | 13.8 | 8.32 | 5.19 | 2.46 | 1.69 | 1.25 |
| Calculated Value (mm) | | 12.615 | 10.417 | 8.894 | 7.890 | 6.931 | 6.647 | 6.481 |
| Practical Value (mm) | 14 | 12.68 | 10.46 | 8.92 | 7.88 | 6.94 | 6.68 | 6.52 |
| Error (mm) | | 0.065 | 0.043 | 0.026 | −0.01 | 0.009 | 0.033 | 0.039 |
| Error (%) | | 0.515 | 0.413 | 0.292 | −0.127 | 0.130 | 0.496 | 0.602 |

EXAMPLE 7

Figure 7:
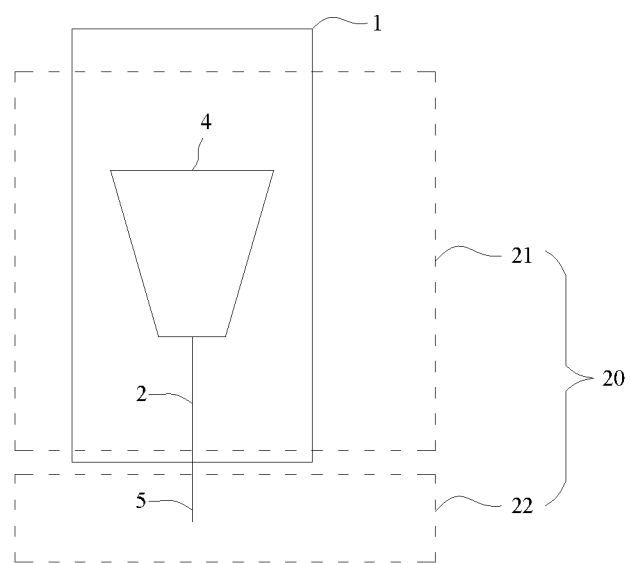
FIG. 7 is a schematic diagram of a seventh structure of a device for detecting thickness of a brake pad provided in an example of the present invention.

Referring to FIG. 7, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The first circuit structure 21 includes two first conducting wires 2 and one resistor body 4. The second circuit structure 22 includes two second conducting wires 5. An isosceles trapezoid constantan sheet, whose upper base length is 1 mm, lower base length is 10 mm, height is 8 mm, and thickness is 1 mm, is used as the resistor body 4, its two trapezoidal surfaces are plated with silver electrodes, and are connected with silver conducting wires (the first conducting wires 2) with a diameter of 0.2 mm at the place close to the upper base, and the resistor body 4 is fixed on the support body 1 made of plastic. The two second conducting wires 5 are respectively connected with ends of the two first conducting wires 2 away from the resistor body 4.

The working process of the device 10 for detecting thickness of a brake pad provided in the present example is as follows:

the support body 1 is fixed with the brake pad, and the lower base of the isosceles trapezoid of the resistor body 4 is aligned with a rubbing surface of the brake pad. A voltmeter is connected in parallel in the circuit, and then is connected with a stabilized-current direct-current power supply of 10 mA.

For the resistor body 4, according to relevant physics knowledge, it can be known that the expression of its total resistance value R is:

$$R = \rho \frac{l}{S}$$

In the expression, $\rho$ indicates the resistivity of the material, l indicates the length along the current direction, and S indicates the sectional area perpendicular to the current direction.

During the rubbing process, the dimension of the resistor body 4 in a direction perpendicular to the rubbing surface will become short, causing the sectional area to be reduced, the resistance R will be increased, the resistance of the resistor body can be calculated by measuring the voltage of the circuit, further the length of the resistor body 4 can be calculated, and further the thickness of the brake pad is obtained.

An initial thickness of the brake pad is measured as 14.02 mm. At this time, the circuit voltage is tested as 58.8 mV. The brake pad is brought to contact and rub the brake disc, after rubbing for a period of time, the rubbing is stopped, and the brake pad is made to not contact the brake disc, the current of the circuit is recorded, and the thickness of the brake pad is measured, then the rubbing is continued, and the foregoing step of rubbing operation is repeated. Thus, a set of data of the current and the thicknesses of the brake pad are obtained, and they are compared with the calculated values (see Table 4). It can be seen from the table that the practical test data are relatively close to the calculated values. The main causes of the errors are measuring error and leaving the influence of temperature out of consideration. On the whole, the errors are below 2.0%, within an acceptable range.

TABLE 4

| Comparison between Test Data and Calculated Data | | | | | | | | |
|---|---|---|---|---|---|---|---|---|
| Voltage (mV) | 58.8 | 121 | 336 | 847 | 1740 | 2920 | 4110 | 6030 |
| Calculated Value (mm) | | 11.468 | 9.13 | 7.84 | 7.188 | 6.852 | 6.677 | 6.519 |
| Practical Value (mm) | 14.02 | 11.26 | 9.06 | 7.78 | 7.06 | 6.76 | 6.64 | 6.48 |
| Error (mm) | | −0.208 | −0.07 | −0.06 | −0.128 | −0.092 | −0.037 | −0.039 |
| Error (%) | | −1.814 | −0.767 | −0.765 | −1.781 | −1.343 | −0.554 | −0.598 |

EXAMPLE 8

Figure 8:
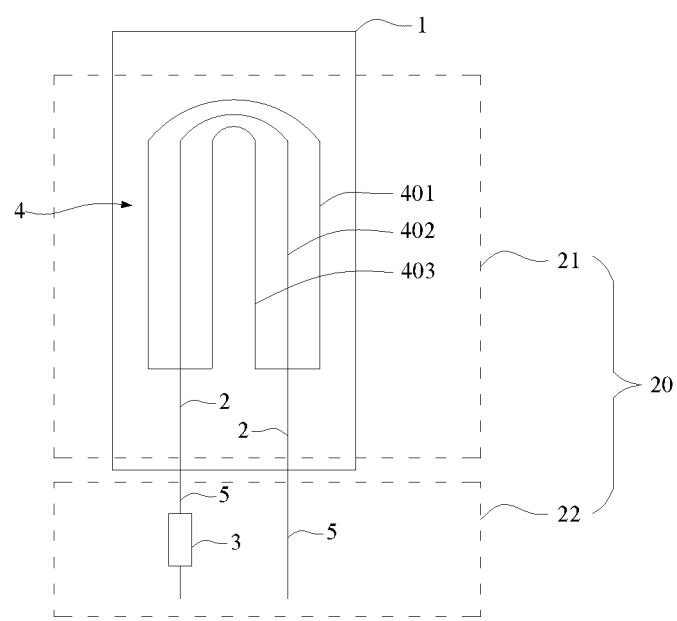
FIG. 8 is a schematic diagram of an eighth structure of a device for detecting thickness of a brake pad provided in an example of the present invention.

Referring to FIG. 8, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The first circuit structure 21 includes two first conducting wires 2 and a resistor body 4. The resistor body 4 includes a sub-resistor body 401, a sub-resistor body 402 and a sub-resistor body 403. All of the sub-resistor body 401, the sub-resistor body 402 and the sub-resistor body 403 are formed by using iron-chromium-aluminum resistance wires with a diameter of 0.2 mm. All of the sub-resistor body 401, the sub-resistor body 402 and the sub-resistor body 403 are folded in half to form a "U" shape, and then fixed on a support body 1 made of plastic. The resistance value of the sub-resistor body 401 is 988 mΩ, the resistance value of the sub-resistor body 402 is 860 mΩ, and the resistance value of the sub-resistor body 403 is 685 mΩ. The sub-resistor body 401, the sub-resistor body 402 and the sub-resistor body 403 are connected in parallel between two first conducting wires 2. The second circuit structure 22 includes two second conducting wires 5 respectively connected with one ends of the two first conducting wires 2 away from the resistor body 4. In the present example, in order to prevent short circuit, the second circuit structure 22 further includes one resistor 3 (with a resistance value of 100 mΩ), and the resistor 3 is provided on one of the second conducting wires 5.

The working process of the device 10 for detecting thickness of a brake pad provided in the present example is as follows:

the support body 1 is fixed with the brake pad, and top portions of the sub-resistor body 401, the sub-resistor body 402 and the sub-resistor body 403 are made to be corresponding to certain thicknesses of the brake pad. The sub-resistor body 401 is corresponding to a position of the brake pad where the thickness is 11 mm, the sub-resistor body 402 is corresponding to a position of the brake pad where the thickness is 9 mm, and the sub-resistor body 403 is corresponding to a position of the brake pad where the thickness is 7 mm. The resistance value of the sub-resistor body 401, the sub-resistor body 402 and the sub-resistor body 403 which are connected in parallel is 275 mΩ. The two second conducting wires 5 are connected with one power supply with a voltage of 100 mV, and the voltage across the series resistors is tested by a voltmeter, the voltage value being 26.7 mV. The brake pad with this device is brought to contact and rub the brake disc for 1 hour, then the contact between the brake pad and the brake disc is disconnected, this device is connected with one power supply with a voltage of 100 mV, and the voltage across the series resistors is tested by a voltmeter, then the rubbing is continued, and the foregoing step of rubbing operation is repeated, and when the voltage across the series resistors is 0 in the case that the brake pad does not contact the brake disc, the rubbing operation is stopped. During this process, when the tested voltage has relatively great changes, the thickness of the brake pad is measured. When the voltage value is changed from 26.7 mV to about 17.9 mV, the thickness of the brake pad is measured as 10.94 mm, the foregoing step of rubbing operation is continued, when the voltage value is changed to be about 12.7 mV, the thickness of the brake pad is measured as 8.98 mm, the foregoing step of rubbing operation is continued, and when the voltage is 0, the thickness of the brake pad is measured as 6.94 mm. Thus, it can be indicated that the voltage value information of the circuit of the present device can reflect the thickness range of the brake pad. In the present example, when the voltage value is about 26.7 mV, all of the sub-resistor body 401, the sub-resistor body 402 and the sub-resistor body 403 are in good state, correspondingly, the thickness of the brake pad is 11 mm or above, reflecting that the thickness of the brake pad is in a normal use range; when the voltage value is about 17.9 mV, the sub-resistor body 401 is disconnected due to the rubbing, correspondingly, the thickness of the brake pad is 9 mm~11 mm, reflecting that the thickness of the brake pad is in the normal use range; when the voltage value is about 12.7 mV, the sub-resistor body 401 and the sub-resistor body 402 are disconnected due to the rubbing, correspondingly, the thickness of the brake pad is 7 mm~9 mm, reflecting that the thickness of the brake pad is in the normal use range, but it should be ready to replace the brake pad; and when the voltage value is 0, all of the sub-resistor body 401, the sub-resistor body 402 and the sub-resistor body 403 are disconnected due to the rubbing, correspondingly, the thickness of the brake pad is 7 mm or below, reflecting that the brake pad is in or less than an critical thickness range, and the brake pad should be replaced immediately.

It should be indicated that the number of the sub-resistor bodies can be configured according practical situations, as long as the number of the sub-resistor bodies is at least two.

EXAMPLE 9

Figure 9:
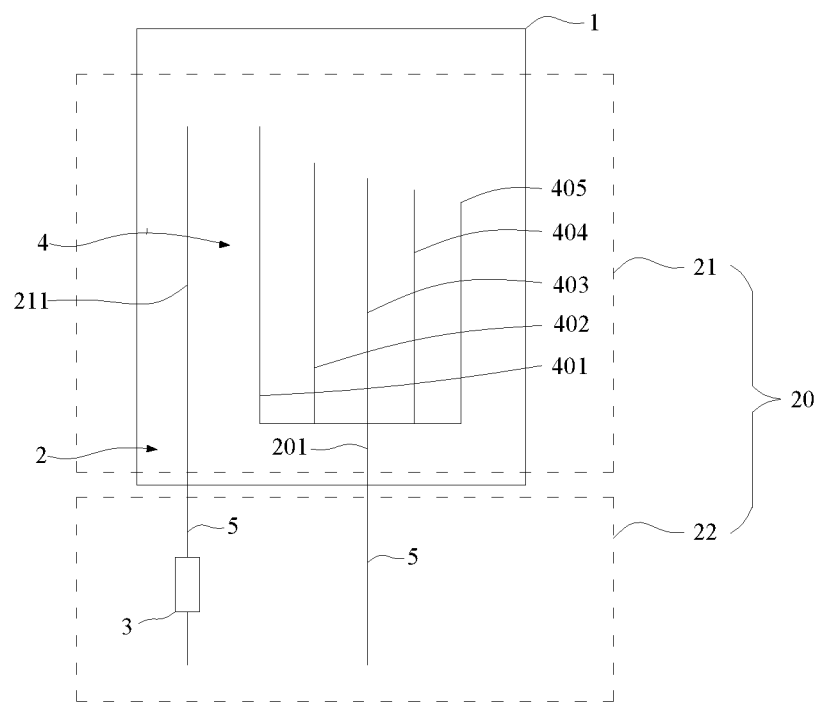
FIG. 9 is a schematic diagram of a ninth structure of a device for detecting thickness of a brake pad provided in an example of the present invention.

Referring to FIG. 9, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The first circuit structure 21 includes a first conducting wire 2 and a resistor body 4. The resistor body 4 includes five sub-resistor bodies. For ease of identification, the five sub-resistor bodies are numbered as a sub-resistor body 401, a sub-resistor body 402, a sub-resistor body 403, a sub-resistor body 404 and a sub-resistor body 405. The first conducting wire 2 includes a first sub-conducting wire 201 and first main conducting wire 211. The first main conducting wire 211, the sub-resistor body 401, the sub-resistor body 402, the sub-resistor body 403, the sub-resistor body 404 and the sub-resistor body 405 are provided side by side at intervals on the support body 1. The sub-resistor body 401, the sub-resistor body 402, the sub-resistor body 403, the sub-resistor body 404 and the sub-resistor body 405 each have one end electrically connected through the first sub-conducting wire 201. The second circuit structure 22 includes two second conducting wires 5. The two second conducting wires 5 are respectively connected with the first sub-conducting wire 201 and the first main conducting wire 211. The sub-resistor body 401, the sub-resistor body 402, the sub-resistor body 403, the sub-resistor body 404 and the sub-resistor body 405 are embodied as constantan resistance wires with a diameter of 0.05 mm. The first sub-conducting wire 201 and the first main conducting wire 211 are embodied as copper wires with a diameter of 0.5 mm. In the present example, in order to prevent short circuit, the second circuit structure 22 further includes one resistor 3 (with a resistance value of 0.75Ω), and the resistor 3 is provided on one of the second conducting wires 5. The resistance value of the sub-resistor body 401 is 2.22Ω, the resistance value of the sub-resistor body 402 is 1.87Ω, the resistance value of the sub-resistor body 403 is 1.64Ω, the resistance value of the sub-resistor body 404 is 1.52Ω, and the resistance value of the sub-resistor body 405 is 1.41Ω.

The working process of the device 10 for detecting thickness of a brake pad provided in the present example is as follows:

the support body 1 is fixed with the brake pad, and a top point of the sub-resistor body 401 is corresponding to a position of the brake pad where the thickness is 9.5 mm, a top point of the sub-resistor body 402 is corresponding to a position of the brake pad where the thickness is 8 mm, a top point of the sub-resistor body 403 is corresponding to a position of the brake pad where the thickness is 7 mm, a top point of the sub-resistor body 404 is corresponding to a position of the brake pad where the thickness is 6.5 mm, a top point of the sub-resistor body 405 is corresponding to a position of the brake pad where the thickness is 6 mm, and a top point of the first main conducting wire 211 fixed on the support body 1 is corresponding to a position of the brake pad where the thickness is 9.5 mm. One direct-current power supply of 1.5 V is connected in series with one ammeter for testing current change of the circuit. An initial thickness of the brake pad is measured as 14.02 mm. The brake pad is brought to contact the brake disc, at which time the circuit current is tested as 0. The brake pad with this device is brought to contact and rub the brake disc, and the current of the circuit is tested, when the current has relatively great changes, the rubbing is stopped, the brake pad is made to contact the brake disc, and the current of the circuit is tested, the thickness of the brake pad is measured; the rubbing is continued, and the current of the circuit is tested, when the current has relatively great changes, the rubbing is stopped, and the brake pad is brought to contact the brake disc, and the current of the circuit is tested, the thickness of the brake pad is measured; the above operations are repeated till the current is greater than 1.45 A, and the rubbing operation is stopped. When the current is changed from 0 to about 0.505 A, the thickness of the brake pad is measured as 9.48 mm; when the current is gradually increased from 0.505 A to about 0.573 A, and then changed to about 0.890 A, the thickness of the brake pad is measured as 7.96 mm; when the current is gradually increased from 0.890 A to about 0.955 A, and then changed to about 1.16 A, the thickness of the brake pad is measured as 6.98 mm; when the current is gradually increased from 1.16 A to about 1.19 A, then changed to about 1.33 A, the thickness of the brake pad is measured as 6.50 mm; when the current is gradually increased from 1.33 A to about 1.36 A, then changed to about 1.45 A, the thickness of the brake pad is measured as 5.98 mm. Thus, it can be indicated that the current information of the circuit of the present device can reflect the thickness range of the brake pad. In the present example, when the current is 0, no resistance wire is electrically connected, correspondingly, the thickness of the brake pad is 9.5 mm or above; when the current is in the range of about 0.505 A~0.573 A, the sub-resistor body 401 is electrically connected with the brake disc, correspondingly, the thickness of the brake pad is 8 mm~9.5 mm; when the current is in the range of about 0.89 A~0.955 A, the sub-resistor body 401 and the sub-resistor body 402 are electrically connected with the brake disc, correspondingly, the thickness of the brake pad is 7 mm~8 mm; when the current is in the range of about 1.16 A~1.19 A, the sub-resistor body 401, the sub-resistor body 402 and the sub-resistor body 403 are electrically connected with the brake disc, correspondingly, the thickness of the brake pad is 6.5 mm~7 mm; when the current is in the range of about 1.33 A~1.36 A, the sub-resistor body 401, the sub-resistor body 402, the sub-resistor body 403 and the sub-resistor body 404 are electrically connected with the brake disc, correspondingly, the thickness of the brake pad is 6 mm~6.5 mm; and when the current is greater than 1.45 A, all of the sub-resistor body 401 the sub-resistor body 402, the sub-resistor body 403, the sub-resistor body 404 and the sub-resistor body 405 are electrically connected with the brake disc, correspondingly, the thickness of the brake pad is 6 mm or below.

It should be indicated that the number of the sub-resistor bodies can be configured according practical situations, as long as the number of the sub-resistor bodies is at least two.

EXAMPLE 10

Figure 10:
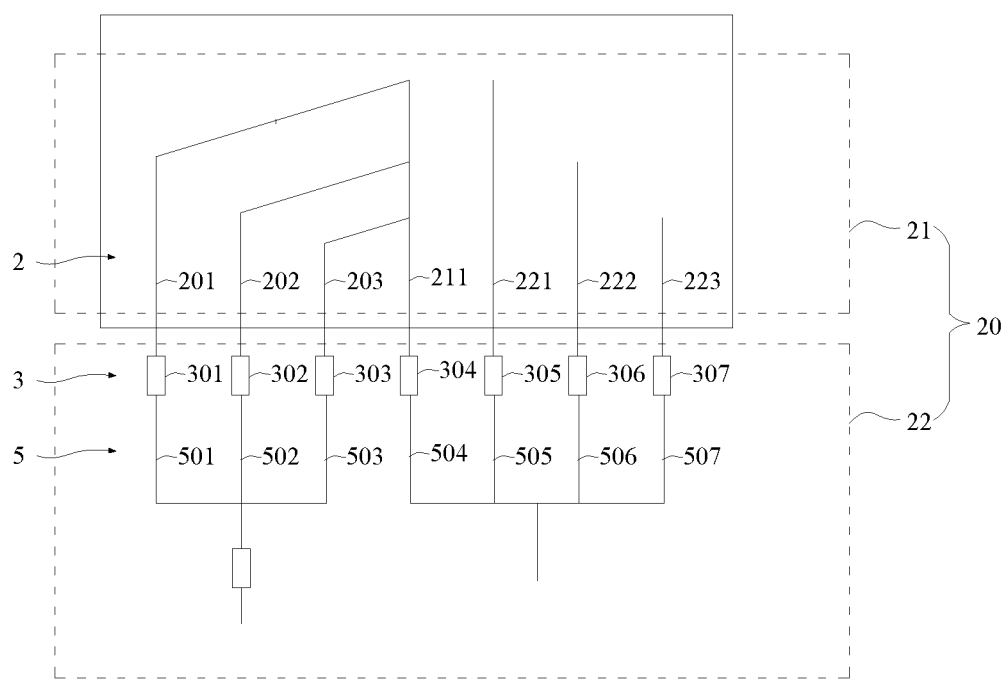
FIG. 10 is a schematic diagram of a tenth structure of a device for detecting thickness of a brake pad provided in an example of the present invention.

Referring to FIG. 10, the present example provides a device 10 for detecting thickness of a brake pad. The device 10 for detecting thickness of a brake pad includes a support body 1 and a circuit structure 20. The circuit structure 20 includes a first circuit structure 21 (outlined by dash lines in the figure) and a second circuit structure 22 (outlined by dash lines in the figure). The support body 1 is embodied as a PCB board having a length of 10 mm, a width of 7.5 mm, and a thickness of 2.0 mm. The first circuit structure 21 includes a first conducting wire 2, and the first conducting wire 2 includes three first sub-conducting wires, one first main conducting wire 211 and three first auxiliary conducting wires. The three first sub-conducting wires, the one first main conducting wire 211 and the three first auxiliary conducting wires are all used to print a silver circuit, with a width of 0.2 mm and a thickness of 0.02 mm, on the support body 1 in a manner of screen printing. For ease of identification, the three first sub-conducting wires are respectively numbered as a first sub-conducting wire 201, a first sub-conducting wire 202 and a first sub-conducting wire 203. For ease of identification, the three first auxiliary conducting wires are respectively numbered as a first auxiliary conducting wire 221, a first auxiliary conducting wire 222 and a first auxiliary conducting wire 223.

The first sub-conducting wire 201, the first sub-conducting wire 202 and the first sub-conducting wire 203 have one ends connected with the first main conducting wire 211 respectively at intervals.

The second circuit structure 22 includes a second conducting wire 5 and a resistor 3. The second conducting wire 5 includes a second sub-conducting wire 501, a second sub-conducting wire 502, a second sub-conducting wire 503, a second sub-conducting wire 504, a second sub-conducting wire 505, a second sub-conducting wire 506 and a second sub-conducting wire 507. The resistor 3 includes a sub-resistor 301 (with the resistance value of 150Ω), a sub-resistor 302 (with the resistance value of 330Ω), a sub-resistor 303 (with the resistance value of 150Ω), a sub-resistor 304 (with the resistance value of 150Ω), a sub-resistor 305 (with the resistance value of 330Ω), a sub-resistor 306 (with the resistance value of 150Ω) and a sub-resistor 307 (with the resistance value of 22Ω). The sub-resistor 301, the sub-resistor 302, the sub-resistor 303, the sub-resistor 304, the sub-resistor 305, the sub-resistor 306 and the sub-resistor 307 are respectively connected to the second sub-conducting wire 501, the second sub-conducting wire 502, the second sub-conducting wire 503, the second sub-conducting wire 504, the second sub-conducting wire 505, the second sub-conducting wire 506 and the second sub-conducting wire 507. The second sub-conducting wire 501, the second sub-conducting wire 502, the second sub-conducting wire 503, the second sub-conducting wire 504, the second sub-conducting wire 505, the second sub-conducting wire 506 and the second sub-conducting wire 507 are respectively connected, in one-to-one correspondence, with the first sub-conducting wire 201, the first sub-conducting wire 202, the first sub-conducting wire 203, the first main conducting wire 211, the first auxiliary conducting wire 221, the first auxiliary conducting wire 222 and the first auxiliary conducting wire 223. The second sub-conducting wire 501, the second sub-conducting wire 502 and the second sub-conducting wire 503, after being connected in parallel, are connected in series with one resistor of 200Ω. The second sub-conducting wire 505, the second sub-conducting wire 506 and the second sub-conducting wire 507 are connected in parallel.

The working process of the device 10 for detecting thickness of a brake pad provided in the present example is as follows:

the support body 1 is fixed with the brake pad, and a position where the first sub-conducting wire 201 is connected with the first main conducting wire 211 and a top point of the first auxiliary conducting wire 221 are corresponding to the thickness of 9.0 mm of the brake pad, a position where the first sub-conducting wire 202 is connected with the first main conducting wire 211 and a top point of the first auxiliary conducting wire 222 are corresponding to the thickness of 7.0 mm of the brake pad, and a position where the first sub-conducting wire 203 is connected with the first main conducting wire 211 and a top point of the first auxiliary conducting wire 223 are corresponding to the thickness of 6.5 mm of the brake pad. The circuit structure is connected with one direct-current power supply of 3.0 V, and one voltmeter is connected with two ends of the series resistors so as to test the voltage value across the resistors. The brake pad is brought to contact and rub the brake disc, and the voltage across the series resistors is tested. When the voltage value has obvious changes, the rubbing is stopped and the thickness of the brake pad is measured, the contact of the brake pad with the brake disc is disconnected, and the voltage across the series resistors is tested; then the rubbing is continued, and the voltage of the parallel resistors is tested, when the resistance value again has obvious changes, the rubbing is stopped and the thickness of the brake pad is measured, so that its contact with the brake disc is disconnected, the voltage value across the parallel resistors is tested; the foregoing step of rubbing operation is repeated, and when the voltage value is about 2.17 V, the rubbing operation is stopped, the thickness of the brake pad is measured, its contact with the brake disc is disconnected, and the voltage value across the parallel resistors is tested. Prior to performing the rubbing operation, the voltage value is tested as about 1.46 V, and the thickness of the brake pad is 14.04 mm. When the voltage value is changed from about 1.46 V to about 1.65 V, the thickness of the brake pad is measured as 8.98 mm, after its contact with the brake disc is disconnected, the voltage across the series resistors is tested as about 1.32 V; the foregoing step of rubbing operation is continued, when the voltage value is changed from about 1.65 V to about 1.86 V, the thickness of the brake pad is 6.96 mm, after its contact with the brake disc is disconnected, the voltage across the series resistors is tested as about 1.20 V; and the foregoing step of rubbing operation is continued, when the voltage value is changed from about 1.86 V to about 2.17 V, the thickness of the brake pad is 6.48 mm, after its contact with the brake disc is disconnected, the voltage across the series resistors is tested as 0. Thus, it can be indicated that the resistance value information of the circuit of the present device can reflect the thickness range of the brake pad. In the present example, when the voltage value is about 1.46 V in both situations that the brake pad contacts and does not contact the brake disc, all the conducting wires are in good state, correspondingly, the thickness of the brake pad is 9 mm or above, reflecting that the thickness of the brake pad is in a normal use range; when the voltage value is about 1.65 V in a situation that the brake pad contacts the brake disc, and the voltage value is about 1.32 V in a situation that the brake pad does not contact the brake disc, correspondingly, the thickness of the brake pad is 7 mm~9 mm, reflecting that the thickness of the brake pad is in the normal use range, but it should be ready to replace the brake pad; when the voltage value is about 1.86 V in a situation that the brake pad contacts the brake disc and the voltage value is about 1.20 V in a situation that the brake pad does not contact the brake disc, correspondingly, the thickness of the brake pad is 6.5 mm~7 mm, reflecting that the thickness of the brake pad is in an critical use range, and the brake pad should be replaced immediately, so as to avoid damage to the brake disc; when the voltage value is about 2.17 V in a situation that the brake pad contacts the brake disc, and the voltage value is 0 in a situation that the brake pad does not contact the brake disc, correspondingly, the thickness of the brake pad is 6.5 mm or below, reflecting that the brake pad cannot be used normally, and if such situation occurs to a vehicle, it is quite dangerous to drive the vehicle, and the brake pad should be replaced before driving, so as to avoid danger.

While the examples of the present invention are illustrated and described, it can be understood by a person ordinarily skilled in the art that, without departing from the principle and spirit of the present disclosure, various modifications, amendments, substitutions and variations can be made to these examples, and the scope of the present invention is defined by the appended claims and equivalents thereof.

The invention claimed is:

1. A device for detecting thickness of a brake pad, comprising a support body and a circuit structure,
   wherein the circuit structure comprises a first circuit structure provided on the support body and a second circuit structure provided outside the support body, and the first circuit structure and the second circuit structure are connected with each other;
   wherein the first circuit structure comprises two first conducting wires and two resistor bodies which are fixed on the support body, wherein each resistor body is a trapezoidal body having a thickness unchanged in an extending direction of the resistor body, and wherein each resistor body is connected with the respective first conducting wire;
   wherein the second circuit structure comprises two second conducting wires provided outside the support body, with the two second conducting wires being structurally connected with the first circuit structure, wherein the two second conducting wires are connected with a resistance meter; and
   wherein the two resistor bodies are configured to be rubbed together with the brake pad when a thickness of the brake pad is within a predetermined thickness range, so that the first circuit structure is electrically connected through contact with a metal brake disc, causing a resistance value of the circuit structure to be reduced,
   wherein each resistor body is an isosceles trapezoid film with a thickness of 0.01 mm, an upper base length of 0.02 mm, a lower base length of 5.50 mm, and a height of 14 mm,
   wherein a resistance valve R of each resistor body is expressed as:

$$R = \sum_{1}^{n} \rho \frac{l_i}{S_i},$$

wherein $\rho$ indicates a resistivity of a material, $l_i$ and $S_i$ indicate a length and sectional area of an i-th section, and n indicates a total number of divided sections of each resistor body.

2. The device for detecting thickness of a brake pad according to claim 1, wherein each of the first conducting wires has respective ends, wherein each of the two resistor bodies has respective ends, wherein the two resistor bodies are respectively connected with the ends of the two first conducting wires, the resistor bodies are configured to extend along a thickness direction of the brake pad, cross sectional areas of the resistor bodies are gradually increased in a rubbing direction of the brake pad, and one end of each of the two resistor bodies away from each first conducting wire corresponds to a position of predetermined thickness of the brake pad;
   the second circuit structure comprises two second conducting wires provided outside the support body, the two second conducting wires are respectively connected with the ends of the first conducting wires away from the resistor bodies.

* * * * *